(12) United States Patent
Chuang et al.

(10) Patent No.: US 7,868,825 B2
(45) Date of Patent: Jan. 11, 2011

(54) APPARATUS AND METHOD FOR TRANSFORMING SIGNAL STRENGTH OF WIRELESS POSITIONING SYSTEM

(75) Inventors: Yu-Hsiang Chuang, Taoyuan County (TW); Wen Tsui, Hsinchu County (TW); Shih-Wen Chiang, Miaoli County (TW); Wen-Chang Hsu, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 169 days.

(21) Appl. No.: 12/168,148

(22) Filed: Jul. 6, 2008

(65) Prior Publication Data

US 2009/0221316 A1 Sep. 3, 2009

(30) Foreign Application Priority Data

Mar. 3, 2008 (TW) .............................. 97107320 A

(51) Int. Cl.
G01S 3/02 (2006.01)
(52) U.S. Cl. ..................................................... 342/451
(58) Field of Classification Search ............ 342/357.01, 342/450, 451, 465; 455/522
See application file for complete search history.

(56) References Cited

U.S. PATENT DOCUMENTS 7,003,056 B2 * 2/2006 Chen .......................... 375/343
7,019,691 B1 * 3/2006 Soltanian et al. ............. 342/368
2005/0181804 A1 8/2005 Misikangas et al.
2008/0191941 A1 * 8/2008 Saban et al. ................. 342/450

OTHER PUBLICATIONS

A. Haeberlen et al., "Practical Robust Localization over Large-Scale 802.11 Wireless Networks," Proceedings of ACM MOBICOM, 2004.

* cited by examiner

*Primary Examiner*—Dao L Phan
(74) *Attorney, Agent, or Firm*—Jianq Chyun IP Office

(57) ABSTRACT

An apparatus for transforming a signal strength of a wireless positioning system is provided. The apparatus is adapted for eliminating the difference of signal strengths between different mobile communication apparatuses or different environments. The apparatus includes a location estimation circuit. The location estimation circuit is adapted to obtain a possible coordinate by calculating a first signal strength distribution received by a mobile communication apparatus. The possible coordinate and the first signal strength distribution are taken as training data for training a transforming module with an approximation algorithm. Accordingly, the present invention adopts a positive correlation index and the approximation algorithm for automatically training a transforming module for the mobile communication apparatus without using the information of chip model and location of mobile communication apparatus.

22 Claims, 11 Drawing Sheets

| Meter | Without any algorithm | Neural network algorithm | Online regression algorithm | Expectation-maximization algorithm |
|---|---|---|---|---|
| Scenario A | 6.29356 | 2.55886 | 2.42993 | 2.25157 |
| Scenario B | 6.04987 | 2.71697 | 2.77763 | 2.45587 |
| Scenario C | 6.68542 | 2.94045 | 2.92621 | 2.85202 |
| Scenario D | 6.34295 | 2.73876 | 2.71126 | 2.51982 |

APPARATUS AND METHOD FOR TRANSFORMING SIGNAL STRENGTH OF WIRELESS POSITIONING SYSTEM

CROSS-REFERENCE TO RELATED APPLICATION

This application claims the priority benefit of Taiwan application serial no. 97107320, filed on Mar. 3, 2008. The entirety of the above-mentioned patent application is hereby incorporated by reference herein and made a part of specification.

BACKGROUND OF THE INVENTION

1. Field of the Invention

The present invention generally relates to an apparatus and a method for regulating a signal strength of a wireless positioning system, and more particularly, to a method and an apparatus for regulating a signal strength of a wireless positioning system, adapted for eliminating a signal strength variation caused by using different wireless devices, network cards, or in different environments.

2. Description of Related Art

Currently, there are many positioning technologies developed and used in navigation, vehicle, and rescue, etc. Recent development of wireless technologies allows the positioning technologies to achieve positioning with signal strength of wireless electric waves. Generally, a strength distribution of wireless signals received by a wireless mobile apparatus can be taken to compare with a signal strength distribution model and then calculated with a fingerprinting method to obtain a possible position probability distribution.

FIG. 1 is a schematic diagram illustrating a system structure of a wireless positioning system 10 and a positioning method thereof. Referring to FIG. 1, the wireless positioning system 10 includes a plurality of wireless access points 100 through 102, and a mobile communication apparatus 110. The mobile communication apparatus 110 would communicate with a wireless positioning apparatus 111. The wireless positioning apparatus 111 is provided to perform an operation flow from steps S120 to S122 for positioning which can be embedded in mobile communication apparatus 110 or in another apparatus.

At step S120, the mobile communication apparatus 110 collects wireless signals emitted from the wireless access points 100 through 102, and the wireless positioning apparatus 111 calculates the wireless signals emitted from the wireless access points 100 through 102 to obtain a signal strength distribution of the collected wireless signals. At step S121, the signal strength distribution of the collected wireless signals is compared with a signal strength distribution model, and a possible position probability distribution is obtained by calculating with a signal fingerprinting method. The signal strength distribution model is a signal strength distribution pre-collected by the mobile communication apparatus 110 from the entire space. Finally, at step S122, a location of the mobile communication apparatus 110 is determined according to the possible position probability distribution obtained from step S121.

Further, the wireless positioning technology may use a hidden Markov model (HMM) to further improve the positioning accuracy. First, a previous possible position probability distribution (also known as prior probability distribution), is relied upon to estimate a present possible position probability distribution, and received signal strength is used for calculating probability distribution by fingerprint. Then final possible position probability distribution (also known as posterior possible position probability distribution) is computed by consider former two probability distribution.

FIG. 2 is a schematic diagram illustrating a concept of a positioning method of calculating the final possible position probability distribution according to an HMM 20. Referring to FIG. 2, the HMM 20 includes an prior possible position probability distribution L(t−1), L(t), L(t+1), possible position probability distribution computed by fingerprint $O(O_{t-1})$, $O(O_t)$, $O(O_{t+1})$, and the posterior possible position probability distribution, P(t−1), P(t), P(t+1). Wherein the posterior possible position probability distribution P(t−1) represents a posterior probability distribution of the position probability distribution at (t−1) second; L(t), the prior probability distribution at t second, can be obtained according to the posterior probability distribution P(t−1) by considering the possible motion of the human being. That is if the probability the probability distribution P(t−1) at a specific position is higher, the probability of the prior probability distribution L(t) will be higher adjacent to the specific position.

The signal strength distribution $O_t$ collected by the mobile apparatus at each second is an independent event, and is related to the position thereof, and is not affected by the signal strength distribution of the previous second. Further, the post-calculation possible position probability distribution $O(O_t)$ is obtained by putting the collected signal strength distribution $O_t$ into a signal strength distribution probability model and calculating with a signal fingerprinting method. The posterior possible position probability distribution P(t) can be obtained by calculating according to the prior possible position probability distribution L(t), and the post-calculation possible position probability distribution $O(O_t)$, so as to determine a final position.

The posterior possible position probability distribution P(t) may affect the anterior possible position probability distribution L(t+1). As shown in FIG. 2, the anterior possible position probability distribution L(t+1) is obtained by a Markov calculation conducted to the posterior possible position probability distribution P(t). Because there are many positions having a similar signal strength distribution distributed in the space, when the wireless positioning technology is applied, the HMM is helpful to eliminate some positions of lower probabilities, and thus improving the accuracy of the positioning.

The collected signal strength distribution $O_t$ is a critical factor affecting the positioning. If the chip model of the mobile communication apparatus used for positioning differs from the chip model of the mobile communication apparatus used for collecting data of signal strength distribution model, signal strengths collected by mobile communication apparatuses with different chip may be different. As such, the signal fingerprinting method may cause an error in positioning, and thus lowering the positioning accuracy. Further, a current wireless fidelity (WiFi) positioning technology typically adopts the signal fingerprinting method, and requires a signal strength distribution model, thus it must have a specific mobile communication apparatus in advance to collect the signal strength distribution of the entire space.

Supposing that there are k wireless access points; a handheld apparatus H is located in a certain position $L_i=\{x,y\}$ in the space; and a quality value distribution of the received signals can be represented as $D_s(H,L_i)$. The signal quality value distribution $D_s(H,L_i)$ is composed of signal strengths of k wireless access points received by the handheld apparatus H at the certain position $L_i=\{x,y\}$. In such a way, the signal quality value distribution $D_s(H,L_i)$ can be represented as $D_s(H,L_i)=\{s_1, s_2, \ldots, s_k\}$. Usually, the signal quality value distribution $D_s(H,L_i)$ is accessed by signal strengths. As such, a signal quality value $s_j$ can be taken as a representation of received signal strength (RSS), so that the signal quality value distribution $D_s(H,L_i)$ can be taken as a signal strength distribution.

In an optimal condition, a signal strength distributions received in the same location should be similar. The signal fingerprinting method is to build a signal strength distribution model by collecting or deducing the signal quality value distribution $D_s(H,L_i)$ at every position in the space. A signal strength distribution model is a set of signal quality value distributions $D_s(H,L_i)$ at all positions in the entire space $L_i$ $D_s(H,L_i)$, $\forall\ L_i$ in space. Then a signal strength distribution $O_t = \{s'_1, s'_2, \ldots, s'_k\}$ can be compared with the signal quality value distribution $D_s(H,L_i)$ to obtain a probability $P(D_s(H,L_i)|O_t)$ corresponding to a certain position $L_i$. Further the possible position probability distribution set $O(O_t) = \{P(D_s(H,L_i)|O_t), \forall\ L_i$ in space$\}$ is computed according to the signal strength distribution $O_t$ at a time point t. Then the posterior possible position probability distribution $P(t)$ can be obtained base on the prior possible position probability distribution $L(t)$ and position probability distribution $O(O_t)$. And thereby, the real position can be evaluated by the posterior possible position probability distribution $P(t)$.

The above method is based upon a basic assumption, that is the mobile communication apparatus used for collecting the signal strength distribution model and the mobile communication apparatus used for positioning should be identical. When such an assumption is satisfied, the signal fingerprinting method performs well, and usually performs with an error value less than 3 meters. However, when the mobile communication apparatuses for collecting the signal strength distribution model and for positioning, respectively, are different, the positioning accuracy is drastically decreased.

Supposing a mobile communication apparatus used for collecting the signal strength distribution model is $H_c$, and a mobile communication apparatus used for positioning is $H_x$, if the located position is L, there would not be high likelihood between $D_s(H_c,L)$ and $D_s(H_x, L)$. As such, if $O_t$ is the signal strength distribution of the mobile communication apparatus $H_x$ received at the time point t, a relative large error may occur.

Referring to U.S. Publication Application No. 2005/0181804 A1 submitted by Misikangas et al., there is employed a transforming module f so as to allow $D_s(H_c,L)$ and $D_s(H_x,L)$ to have a better likelihood, that is trying to satisfy the equation $D_s(H_c,L) = f(D_s(H_x,L))$. FIG. 3 is a system block diagram of a wireless positioning system 30 having a transforming module proposed by Misikangas et al. Referring to FIG. 3, the wireless positioning system 30 includes a plurality of wireless access points 301, 302, . . . , 30k, a plurality of mobile communication apparatuses 311, 312, . . . , 31n, and a transforming and positioning module 320. The transforming and positioning module 320 includes a transforming module circuit 321, a position calculation module 322, a selecting circuit 323, and a look-up table 324.

The mobile communication apparatuses 311, 312, . . . , 31n, are different mobile communication apparatuses, respectively corresponding to models $H_1, H_2, \ldots, H_n$. Data modules $DM_1, DM_2, \ldots, DM_n$ in the look-up table 324 are transforming modules of the signal strength distribution received by different mobile communication apparatuses 311, 312, . . . , 31n. The transforming module circuit 321 includes a plurality of transforming modules $DM'_1, DM'_2, \ldots, DM'_n$, for transforming the received signal strength distributions. The position calculation module 322 is provided for calculating the position according to the transformed signal strength distribution, so as to determine the position. The selecting module 323 is adapted to select a corresponding transforming module $DM_i$ from the look-up table 324 according to the model of the mobile communication apparatus, and thus determining a transforming module $DM'_i$ in the transforming module circuit 321 to use according to the corresponding transforming module $DM_i$. This is a relatively simple approach, in which a transforming module is built corresponding to all mobile communication apparatuses 311 through 31n. Prior to calculating the position, the corresponding transforming module is selected from the look-up table 324 according to the model of the mobile communication apparatus, and then the received signal strength is transformed by the selected transforming module to a corresponding value of the signal strength distribution model received by the apparatus. The transformed value is then introduced into the above calculation to obtain the position.

Although relatively simple, this approach is time-consuming to generate a large look-up table 324, in which all possibilities of matching must be considered. Further, the wireless positioning system must be aware of the models of the currently used mobile communication apparatuses 311 through 3 in, before looking up the look-up table 324. However, sometimes the models of the currently used mobile communication apparatuses 311 through 31n cannot be obtained by software or the operation systems. Or otherwise, even when the models are obtained, the models may not correspond to the contents in the look-up table 324.

Correspondingly, the U.S. Patent Application No. 2005/0181804 A1 proposes a substitutive approach, in which if accurate models $H_1$ through $H_n$ cannot be obtained, or the models $H_1$ through $H_n$ are not well matched, some locations which are convenient for judgement are provided to serve as reference points, for example, an inlet of the space. Therefore, the transforming and positioning module 320 may probably determine that the user happens to be at the position of the inlet of the space, and then automatically determine a transforming module $DM_i$ of an optimal calculation result from the look-up table 324.

Referring now to "Practical robust localization over large-scale 802.11 wireless networks," A. Haeberlen, E. Flannery, A. M. Ladd, A. Rudys, D. S. Wallach, and L. E. Kavraki, published in Proceedings of ACM MOBICOM, 2004. Haeberalen et al. consider the problem to be similar to that described by Misikangas et al., while providing more practical examples and more detailed discussion of such practical examples, and therefore the thesis is more valuable for reference.

FIG. 4 is a table showing three different sets of WiFi chip models and the relative equations thereof. FIG. 5 is a corresponding curve diagram showing practically transformed signal strengths and experimental signal strengths received by different mobile communication apparatuses. Referring to FIG. 4, the table is practically obtained from an experiment of Heaberlen et al. Corresponding to different chip models, $C_1$ and $C_2$ can be learnt from the correlation which are practically transformed and practically experimented. Referring to FIG. 5, x-axis represents the signal strength of the signal strength distribution received by the mobile communication apparatus $H_c$, and y-axis represents the signal strength of the signals strength distribution received by an unknown apparatus $H_x$. As shown in FIG. 5, the points marked with X correspond to signal strengths which are not transformed, while the points marked with ○ correspond to the linearly transformed signal strengths. Apparently, the points marked with ○ are very close to the ideal curve, and therefore the linear transformation proposed by Haeberlen et al. is rather successful.

In the thesis, Haeberlen et al. further discuss an interesting fact, that is the changes of the signal strengths caused by the environmental variation are also linear. FIG. 6 is a corresponding curve diagram showing practically transformed signal strengths and experimental signal strengths received in different environments. Referring to FIG. 6, x-axis represents the signal strength of the signals strength distribution received in a morning of a certain day, and y-axis represents the signal strength of the signals strength distribution received at the late night of the certain day. Since the actions of the human being between the daytime and the night time are different, and some wireless access points are usually turned off during the night time, the signal strengths are drastically varied. The points marked with X marks corresponds to signal strengths which are not transformed, while the points marked with ○ marks corresponds to linearly transformed signal strengths. Apparently, the points marked with ○ marks are very close to the ideal curve, and therefore the linear transformation proposed by Haeberlen et al. is rather successful.

As such, a better accuracy can be achieved by incorporating a pre-built transforming module with the linear correlation proposed by Haeberlen et al. However, as specified in the thesis, the transforming module must be built in a manual or semi-manual manner. Although, Haeberlen et al. proposes to use expectation maximization for automatically training the transforming module, Haeberlen et al. admit that the corresponding positioning performance is not as good as the manual method. Further, Haeberlen et al. fail to teach the procedure and the step of the expectation maximization method.

In summary, although all of the above-mentioned methods provide a solution to the problem that different mobile communication apparatuses are used when training and positioning in the wireless positioning system, each of the methods has to previously determine the matching linear correlation. Since there are not many WiFi chip manufacturers, and it might be possible to determine matching relationship between the existing chip models. In addition, if the same chips model are equipped to different mobile communication apparatuses, they may be operated with different antennas. For example, laptop computers from different manufacturers may adopt same chip models, but unfortunately, the antennas equipped thereto are very likely to be different, and thus generate signal variations. In this manner, it is almost a mission impossible to provide transformation modules for matching all kinds of mobile communication apparatuses, while regularly updating data in the look-up table. On the other hand, the automatic method proposed by Haeberlen et al. does not provide any detail of feasible solution thereto.

SUMMARY OF THE INVENTION

Accordingly, the present invention is directed to an apparatus and a method for transforming a signal strength of a wireless positioning system. The apparatus and the method are adapted for instantly obtaining a transforming module between two mobile communication apparatuses $H_x$ and $H_c$. And the invention does not need the information of chip model and location of mobile communication apparatuses.

The present invention provides an apparatus for transforming a signal strength of a wireless positioning system. The apparatus includes a location estimation circuit. The location estimation circuit is adapted to obtain a possible coordinate by calculating a positive correlation index according to a first signal strength distribution received by a mobile communication apparatus, wherein the present invention does not need the information of chip model and location of mobile communication apparatuses.

According to an embodiment of the present invention, a method for transforming a signal strength of a wireless positioning system is provided. The method includes the step of: (a) receiving a first signal strength distribution from a mobile communication apparatus which maybe without information of chip model and location; and (b) generating a possible coordinate by calculating a positive correlation index according to the first signal strength distribution under an instant dynamic environment.

The present invention adopts the positive correlation index and the approximation algorithm for automatically training a transforming module for the mobile communication apparatus which maybe without information of chip model and location.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 13 is an error table showing the errors between the positioned location and the real location according to the embodiment of the present invention.

DESCRIPTION OF THE EMBODIMENTS

Figure 1:
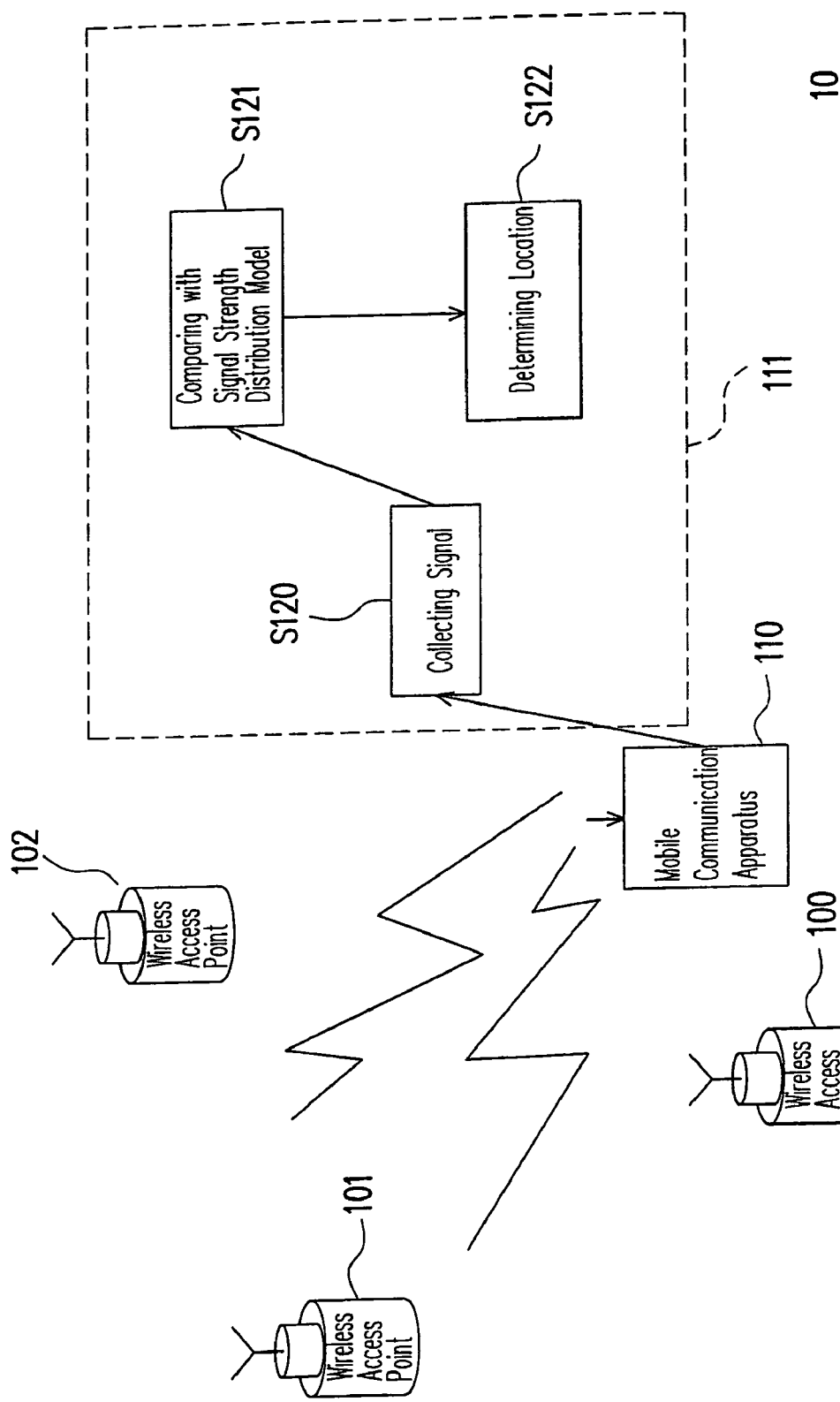
FIG. 1 is a schematic diagram illustrating a system structure of a wireless positioning system 10 and a positioning method thereof.
Figure 2:
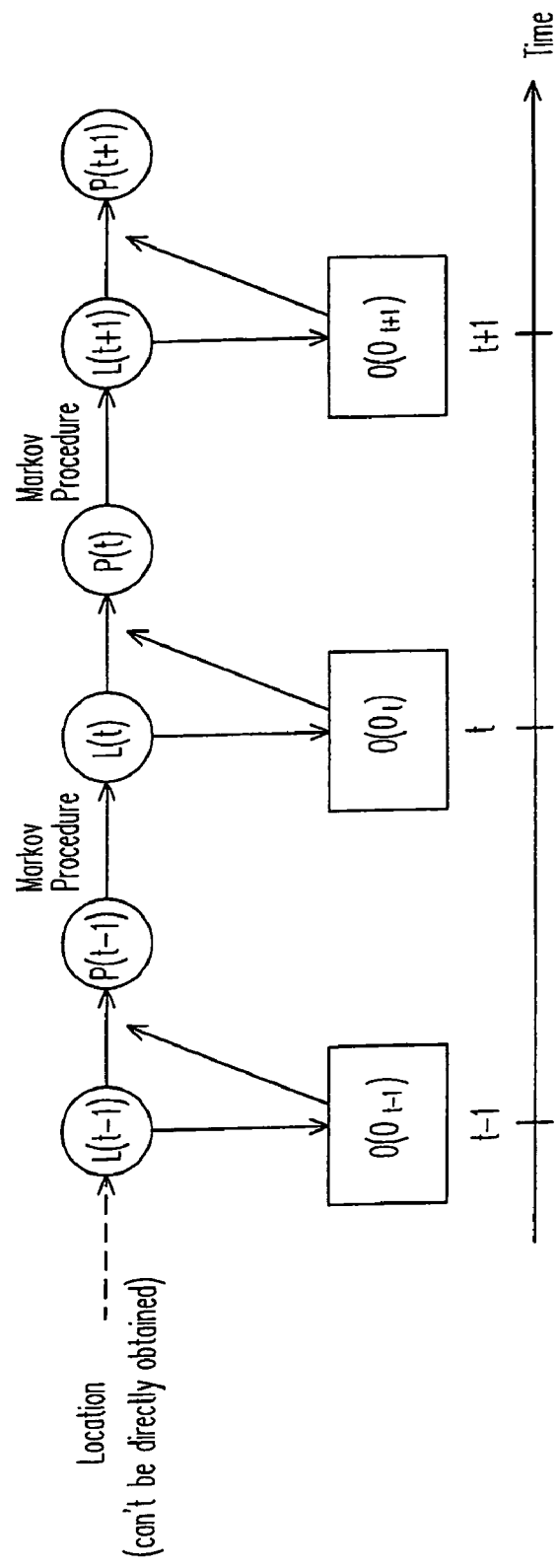
FIG. 2 is a schematic diagram illustrating a concept of a positioning method of calculating the final possible position probability distribution according to an HMM 20.
Figure 3:
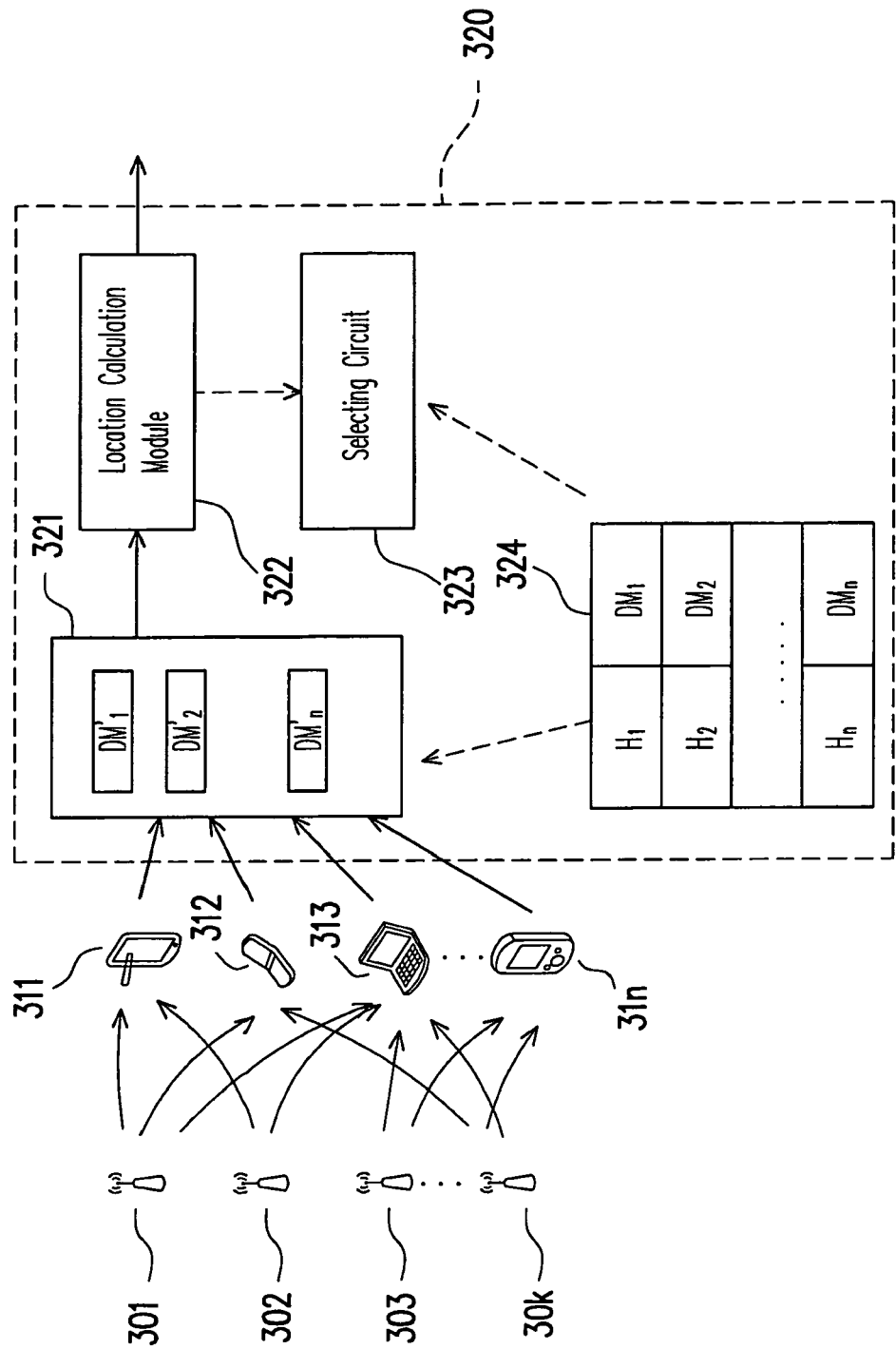
FIG. 3 is a system block diagram of a wireless positioning system 30 having a transforming module proposed by Misikangas et al.
Figures 4, 5:
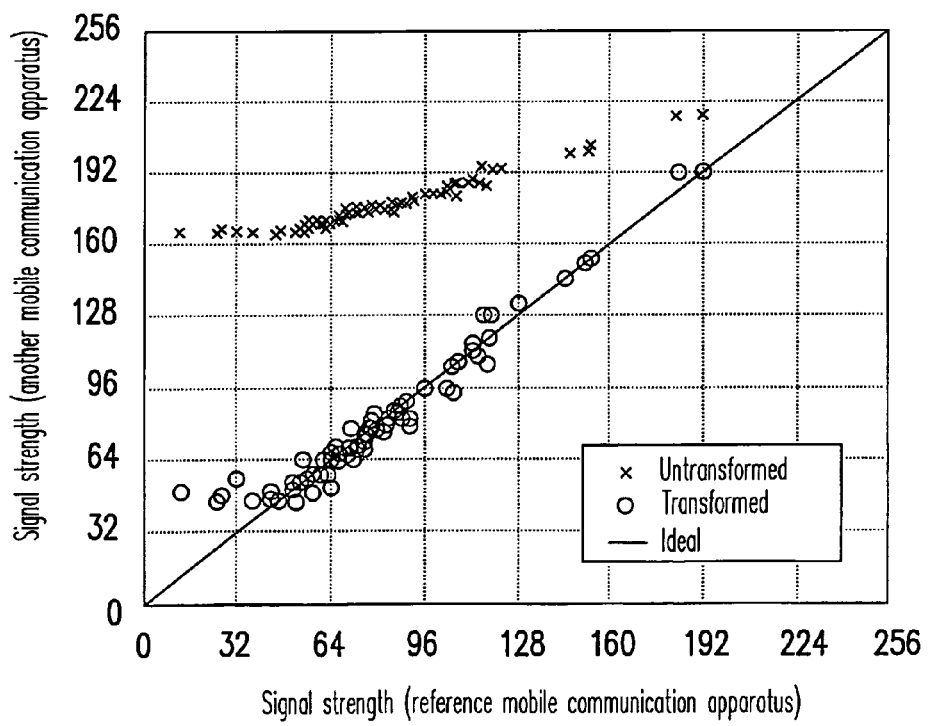
FIG. 4 is a table showing three different sets of WiFi chip models and the relative equation thereof.
FIG. 5 is a corresponding curve diagram showing practically transformed signal strengths and experimental signal strengths received by different mobile communication apparatuses.
Figure 6:
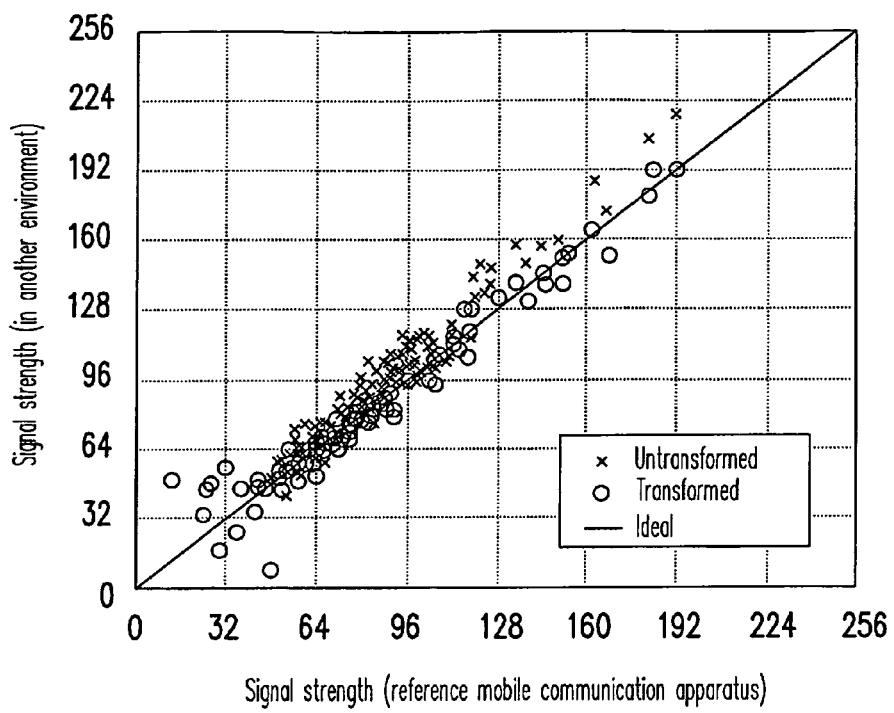
FIG. 6 is a corresponding curve diagram showing practically transformed signal strengths and experimental signal strengths received in different environments.

Reference will now be made in detail to the present preferred embodiments of the invention, examples of which are illustrated in the accompanying drawings. Wherever possible, the same reference numbers are used in the drawings and the description to refer to the same or like parts.

If a signal strength distribution model in a space is measured by a mobile communication apparatus $H_c$, while when positioning, a signal strength distribution thereof is measured by a different mobile communication apparatus $H_x$, there would be difference between the measured signal strengths. Therefore, when the mobile communication apparatus $H_x$ conducts a positioning operation according to the signal strength distribution model obtained by the mobile communication apparatus $H_c$, a relatively large error may occur. There is a high linear correlation between signals strengths collected by different mobile communication apparatuses, and therefore a transforming module may be employed for transforming the signal strength detected by the mobile communication apparatus $H_x$ into an analog of the signal strength detected by the mobile communication apparatus $H_c$.

The present invention provides an apparatus and a method for transforming a signal strength of a wireless positioning system, which can automatic training a transforming module f for an mobile communication apparatus $H_x$ which maybe without information of chip model and location. According to the transforming module f, the signal strength received by the mobile communication apparatus $H_x$ can be transformed, and the transformed signal strength is approximate to the signal strength of the mobile communication apparatus $H_c$ which is used to collect signals to build signal strength distribution model (i.e. the signal strength distribution model is a data set records all the signal strength distributions in the space.). In other words, the transforming module f which is most likely satisfying the equation $D_s(H_c,L_i)=f(D_s(H_x,L_i)$ is intended to achieve.

In the conventional technology, the location $L_i$ must be a known condition. In other words, there must be a procedure of training the transforming module in which signal strength distributions received by the mobile communication apparatuses $H_c$ and $H_x$, respectively, at a same location, are fed back to the wireless positioning system, so that the wireless positioning system can conveniently calculate to obtain the transforming module f. Or otherwise, the chip model of the apparatus should be known, so that the transforming module f can be achieved by looking up a look-up table.

The apparatus and method provided by the present invention are adapted for automatically determining a transforming module f without using information of location and chip model of mobile communication apparatus and thus obtain a predicting location $L_e$, which satisfies the equation of:

$$L_e = L_i \text{ iff } P(L_i|O'_t) > P(L_j|O'_t)_{\forall i \neq j},$$

and in such a way correctly estimate the location. As discussed above, there is a positive correlation relationship between signal strengths measured by different communication apparatuses at a same location, and therefore we can use the transforming module f to transform the signal strength detected by the mobile communication apparatus $H_x$, and let the transformed signal strength value approach to the signal strength value measured by the mobile communication apparatus $H_c$.

When it is intended for automatically training the transforming module instantly without using information about the mobile communication apparatus and the correct location, the only information can be used are an environmental signal strength distribution model $D_s(H_c, L_i)$, $\forall L_i$ in space, and an signal strength $O_t$ observed by the mobile communication apparatus $H_x$. If the transformed signal strength distribution $O'_t = f(O_t)$, is close to the signal strength distribution received by the mobile communication apparatus $H_c$, then upon exclusion of any unstable situation, at any time it should can find out a location where the transformed signal strength distribution should be close to the signal strength distribution recorded in the signal strength distribution model.

As such, the trained transforming module is applicable to achieve a very high probability for the transformed signal strength distribution to determine a location in the signal strength distribution model which has an analogous signal strength distribution during the training time. In other words, the transformed signal strength distribution $O'_t$ transformed by the transforming module f, should make the sum of maximum probabilities $$\max\{P(D_s(H_c,L_i)|O'_t), \forall L_i \text{ in space}\},$$

which are obtained by calculating with the signal fingerprinting method in the environmental signal strength distribution model during the training time, to achieve a maximum value.

$$\sum_{t=0}^{train\_time} \max\{P(D_s(H_c, L_i) | O'_t), \forall L_i \text{ in space}\}$$

Wherein training_time represents the length of the training time. However, the complexity of the foregoing calculation is related to the training time training_time, a volume of the space $L_i$, a quantity of the wireless access points, etc, while the length of the training time also affect the accuracy of the trained transforming module. As such the complexity is very high. Therefore, approximation algorithms should be used in order to instantly obtain an optimal approximate transforming module for eliminating the difference between different mobile communication apparatuses and whereby obtaining the better solutions in a multi-user and instant condition.

Figure 7:
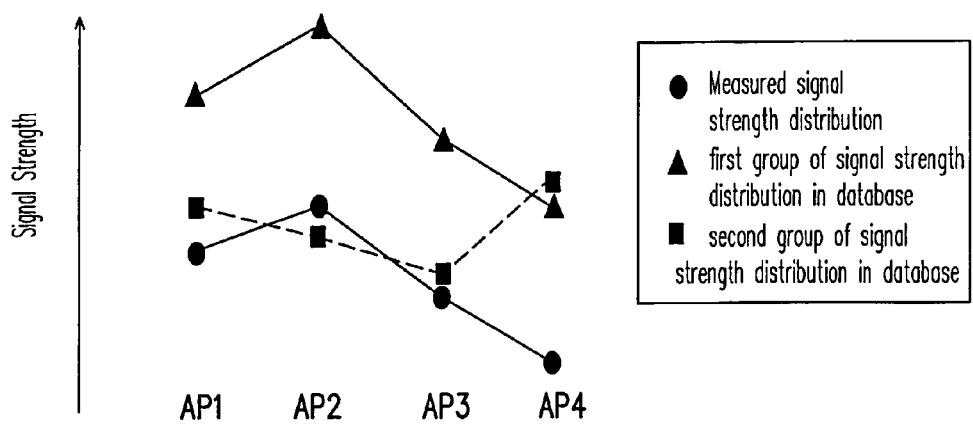
FIG. 7 is a curve diagram illustrating signal strength distributions according to an embodiment of the present invention.

Because of the difference of measured signals of different mobile communication apparatuses, there would raise a certain error when using the equation of $P[D_s(H,L_i)|O_t]$ for probability calculation. Therefore, an embodiment of the present invention provides a solution to solve the problem, in which a positive correlation index is introduced in the apparatus and method according to the embodiment of the present invention for determining the possible coordinate (i.e. possible location), and solving the problem of complexity. FIG. 7 is a curve diagram illustrating signal strength distributions according to an embodiment of the present invention. Referring to FIG. 7, AP1 through AP4 represent wireless access points; a signal strength distribution measured at an unknown location is marked with ● marks; a first group of signal strength distribution and a second group of signal strength distribution which are approximate to the signal strength distribution marked with ● marks are respectively marked with ▲ and ■ marks. Solely considering the probabilities, the second group (marked with ■ marks) is apparently higher than the first group (marked with ▲ marks). However, in fact, the first group (marked with ▲ marks) is more likely to be positive correlated to the observed signals (marked with ● marks), and is more likely to be a similar signal strength distribution.

According to an aspect of the embodiment, the positive correlation index is a correlation coefficient defined as $$r = \frac{1}{n-1}\sum_{i=1}^{n}\left(\frac{x_i - \bar{x}}{S_x}\right)\left(\frac{y_i - \bar{y}}{S_y}\right)$$

in which n represents a number of the signal strength distribution data, $y_i$ and $x_i$ represent the $i^{th}$ signal strength distribution data in a database and the $i^{th}$ measured signal strength distribution data; $\bar{x}$ and $\bar{y}$ are averages of $x_i$ and $y_i$ respectively; and $S_x$ and $S_y$ represent standard deviations of $x_i$ and $y_i$ respectively. However, it should be noted that the positive correlation index is employed according to an embodiment of the present invention without restricting the scope of the present invention.

Figure 8:
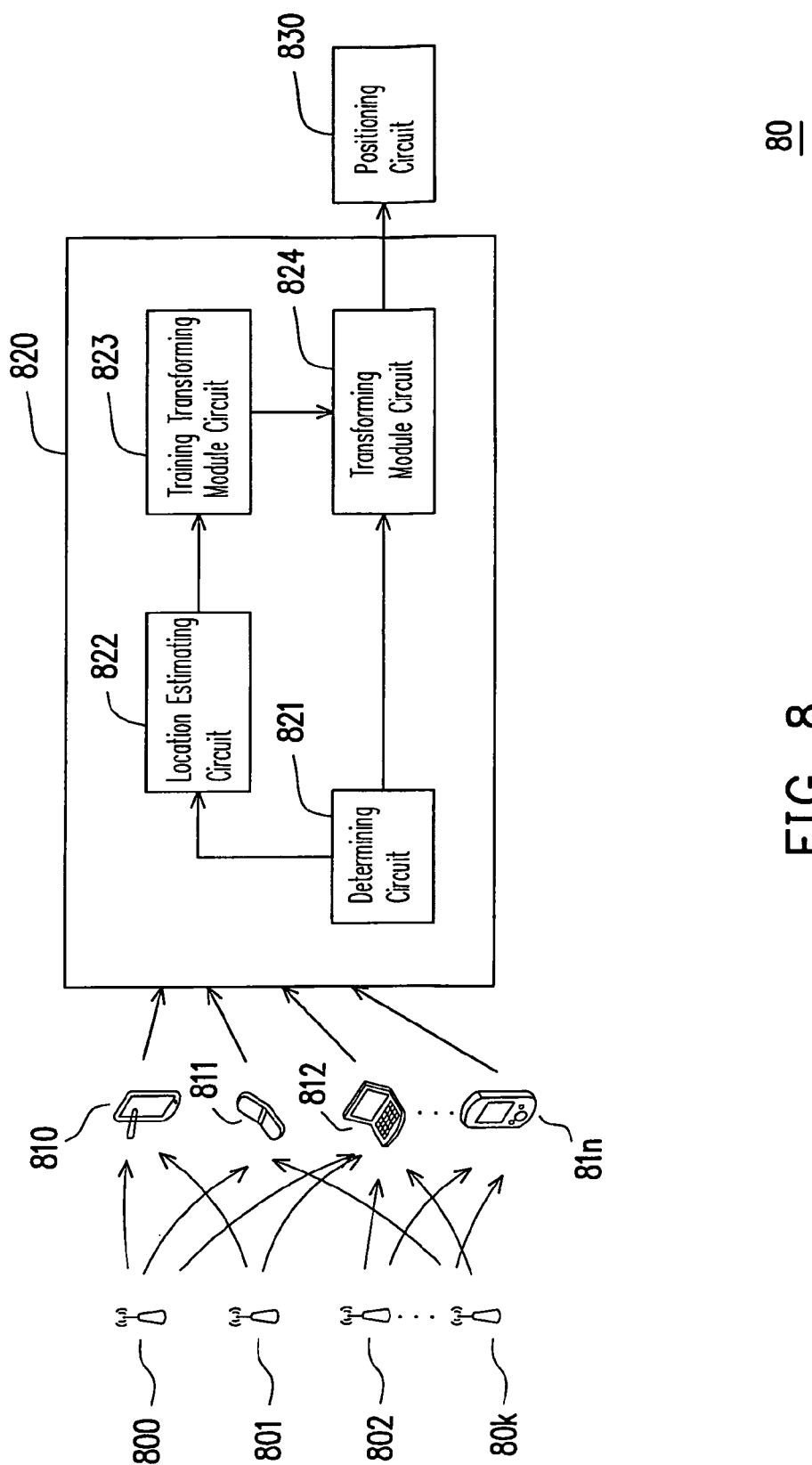
FIG. 8 is a system block diagram illustrating an apparatus 820 for transforming a signal strength applied in a wireless positioning system 80 according to an embodiment of the present invention.

FIG. 8 is a system block diagram illustrating an apparatus 820 for transforming a signal strength applied in a wireless positioning system 80 according to an embodiment of the present invention. Referring to FIG. 8, the wireless positioning system 80 includes a plurality of wireless access points 801, 802, ..., 80k, a plurality of mobile communication apparatuses 811, 812, ..., 81n, a transformation apparatus 820, and a positioning circuit 830. The transformation apparatus 820 includes a determining circuit 821, a location estimation circuit 822, a training transforming module circuit 823, and a transforming module circuit 824. The determining circuit 821 is coupled to the transforming module circuit 824 and the location estimation circuit 822. The training transforming module circuit 823 is coupled to the location estimation circuit 822 and the transforming module circuit 824. The transforming module circuit 824 is coupled to the positioning circuit 830.

First, the determining circuit 821 determines whether there is a transforming module generated. If there is no transforming module generated (or convergent), the location estimation circuit 822 estimates a possible coordinate according to a signal strength distribution received by one of the mobile communication apparatuses 811-81n. The location estimation circuit 822 utilizes a positive correlation index, or optionally referring to a possibility index for determining a possible coordinate corresponding to each of a plurality of time points. The signal strength distribution at the possible coordinate recorded by the signal strength distribution model, and the signal strength distribution $O_t$ collected by the mobile communication apparatus of the time point (one of 810 through 81n which chip model is unknown yet) can be taken as training data for the training transforming module circuit 823. After training the transforming module, the transforming module circuit 824 transforms the signal strength distribution $O_t$ collected by the mobile communication apparatus into a transformed signal strength distribution $O'_t$ according to the transforming module. Then, the positioning circuit 830 positions according to the signal strength distribution model $D_s(H_c, L_i), \forall L_i$ in space, and the transformed signal strength $O'_t$. Further, if the transforming module has been generated (or convergent), then the transforming module 824 is directly used to transform the signal strength distribution $O_t$ collected by the mobile communication apparatus into a transformed signal strength distribution $O'_t$ according to the transforming module, and meanwhile the location estimation circuit 822 does not provide the training data (i.e. the collected signal strength distribution $O_t$ data) for the training transforming module circuit 823.

The training data includes a signal strength distributions at the possible coordinates recorded by a signal strength distribution model and the signal strength distributions received by the mobile communication apparatus, and wherein the signal strength distribution model is a data set records all the signal strength distributions in the space. After the signal strength distribution received by the mobile communication apparatus is being transformed by the transforming module, the positioning circuit 830 is used to obtain the positioning coordinate of the mobile communication apparatus at any time point according to a signal strength distribution model and the transformed signal strength distribution, in which the signal strength distribution recorded in signal strength distribution model at the positioning coordinate and the transformed signal strength distribution are approximate to each other.

The transforming module is obtained according to the training data generated by location estimation circuit, and the implementation of obtaining the transforming module can be implemented by adopting an approximation algorithm. The approximation algorithm can be, but not limited to, an online regression algorithm, an expectation-maximization algorithm, a neural network algorithm, an ant colony optimization (ACO) algorithm, a simulated annealing algorithm, a particle swarm optimization (PSO) algorithm, or a genetic algorithm (GA).

Further, it should be noted that the location estimation circuit 822 can also be directly used for positioning. The location estimation circuit 822 is capable of utilizing the positive correlation index to determine the possible coordinate corresponding to each time point, so that a possible coordinate at a certain time point can be taken as a positioning coordinate (i.e. positioning location).

Furthermore, as discussed above, the location estimation circuit 822 can simultaneously utilize the positive correlation index and the probability index for calculating the possible location and providing the training data. According to an aspect of the embodiment, one approach of doing so is setting weights for the positive correlation index and probability index, and then calculating the possible coordinate and providing the training data according to the two indices. The probability index may be assumed to be a Gauss distribution, represented as $$f = \prod_{i=1}^{m} p(X_i) = \prod_{i=1}^{m} \frac{1}{\theta_i\sqrt{2\pi}} e^{-\frac{\left(\frac{X_i}{\theta_i}\right)^2}{2}}$$

in which $\theta_i$ represents a standard deviation of signal variation of the $i^{th}$ mobile communication apparatus; $X_i$ represents a difference between the signal strength received by the $i^{th}$ mobile communication apparatus and the signal strength recorded by the $i^{th}$ mobile communication apparatus; and m represents a number of the wireless communication apparatuses.

The transformation apparatus 820 and the positioning apparatus 830 can be applied incorporating with a plurality of approximation algorithms of artificial intelligence. Three relative algorithms are provided here-below for illustrating the embodiment without restricting the scope of the present invention. However, other approximation algorithms of artificial intelligence can also be utilized in complying with the present invention in accordance with the concept illustrate above of utilizing the positive correlation index in estimating the possible coordinate and generating the training transforming module data. The other approximation algorithms of artificial intelligence may be an ant colony optimization (ACO) algorithm, a simulated annealing algorithm, a particle swarm optimization (PSO) algorithm, or a genetic algorithm (GA).

Figure 9:
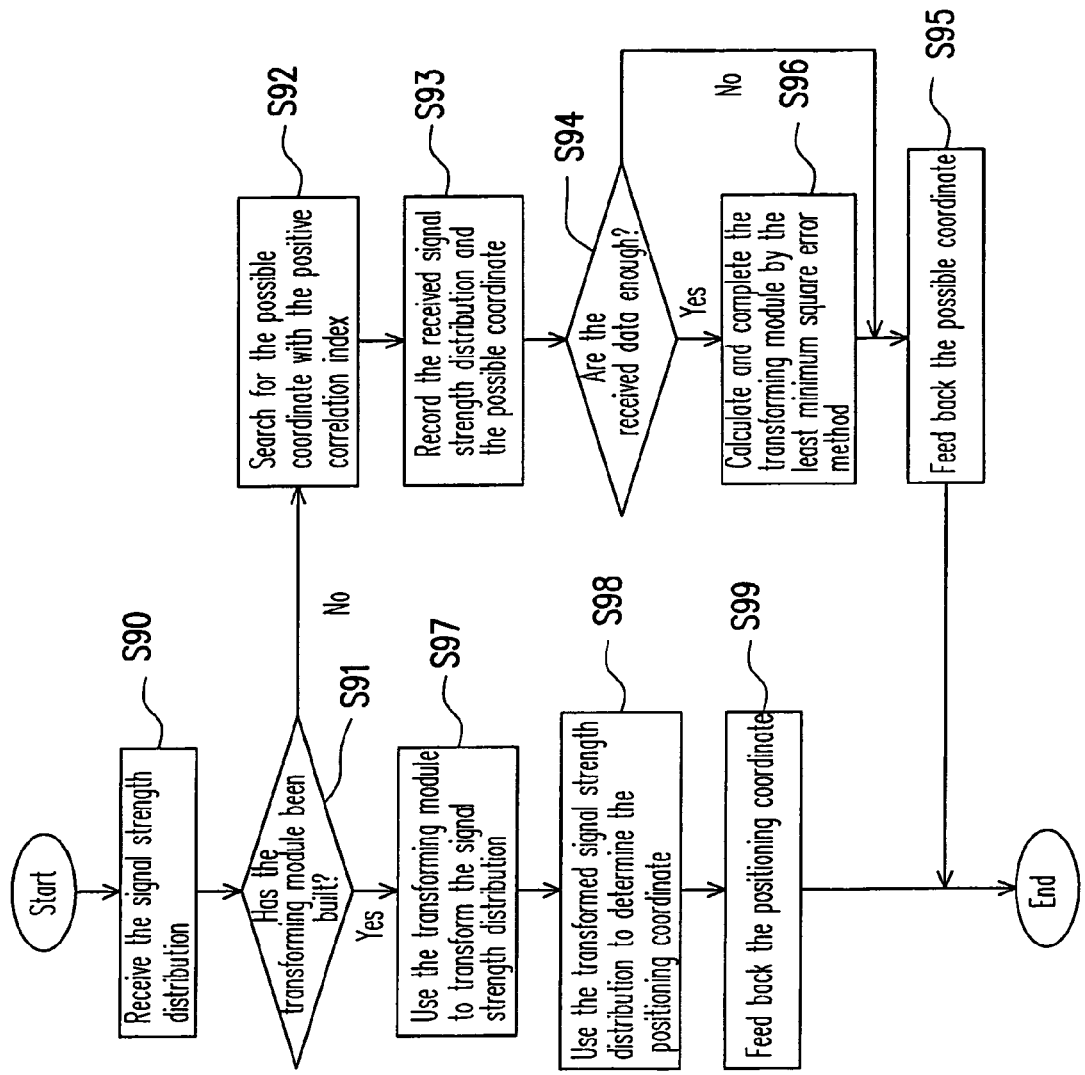
FIG. 9 is a flow chart illustrating an online regression algorithm method adopted by the apparatus 820 and the positioning circuit 830 according to an embodiment of the present invention.

FIG. 9 is a flow chart illustrating an online regression algorithm method adopted by the apparatus 820 and the positioning circuit 830 according to an embodiment of the present invention. Referring to FIG. 9, at step S90, an unknown mobile communication apparatus $H_x$ receives a signal strength distribution $O_t$; at step S91, the determining circuit 821 determines whether a transforming module is generated, wherein if a transforming module is generated, then the procedure proceeds to step S97, and if a transforming module is not generated, then the procedure proceeds to step S92. At step S92, the location estimation circuit 822 utilizes a positive correlation index to estimate a possible coordinate where the unknown mobile communication apparatus $H_x$ is at, and then the training transforming module circuit 823 takes the signal strength distribution at the possible coordinate and the received signal strength distribution $O_t$ of the present time point data for matching. Next, at step S93, the signal strength distribution $O_t$ and a possible coordinate corresponding to a maximum value of the positive correlation index are recorded. At step S94, it is determined whether the collected signal strength distribution $O_t$ data are enough, wherein if it is determined that the collected signal strength distribution $O_t$ data are enough, the procedure proceeds to step S96, and if it is determined that the collected signal strength distribution $O_t$ data are not sufficient, the procedure proceeds to step S95. At step S96, the training transforming module circuit 823 obtains the transforming module by calculating with a method such as the least minimum square error method; and at step S95, the positioning circuit 830 feeds back the possible coordinate at where the positive correlation index is maximum to the mobile communication apparatus $H_x$.

Figure 10:
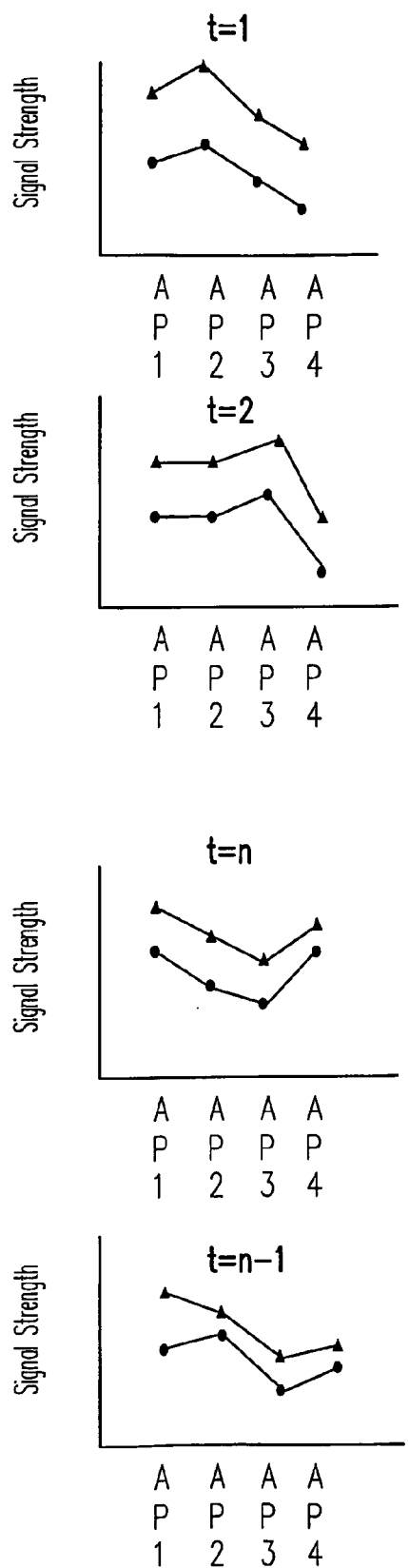
FIG. 10 is a curve diagram showing a signal strength distribution at possible location recorded in signal distribution model and the signal strength distribution $O_t$ received by the unknown communication apparatus $H_x$ at each time point.

FIG. 10 is a curve diagram showing a signal strength distribution at possible coordinate recorded in signal strength distribution model and signal strength distribution received by the unknown communication apparatus $H_x$ at each time point. Referring to FIG. 10, at a time point t=1, a signal strength (points marked with ▲ marks) of a wireless access point $AP_1$ at the possible coordinate recorded in signal strength distribution model is matched with a signal strength (points marked with ● marks) of the wireless access point $AP_1$ received by the mobile communication apparatus $H_x$ at that time point as a pair. A signal strength of a wireless access point $AP_2$ at the possible coordinate recorded in signal strength distribution model is compared with a signal strength of the wireless access point $AP_2$ received by the mobile communication apparatus $H_x$ at that time point as a pair. In a similar manner, matched data pairs of n time points are collected. Finally, the transforming module (i.e. $C_1$, $C_2$ of the linear correlation as mentioned in the conventional technology) can be obtained by computing the least minimum square error method according to the matched data pairs mentioned above. A principle of this method is based on an assumption that several anterior possible coordinate determination may have more or less errors, while a large amount of data are considered, the final training result would approach to a real value.

Now referring to FIG. 9 again, at step S97, the transforming module is used to transform the signal strength distribution received by the mobile communication apparatus $H_x$, in which the transformed signal strength distribution would be approximate to the second signal strength distribution at the possible coordinate. At step S98, the transformed signal strength distribution is used in determining the positioning coordinate of the mobile communication apparatus $H_x$. At step S99, the positioning coordinate is fed back to the mobile communication apparatus $H_x$.

Figure 11:
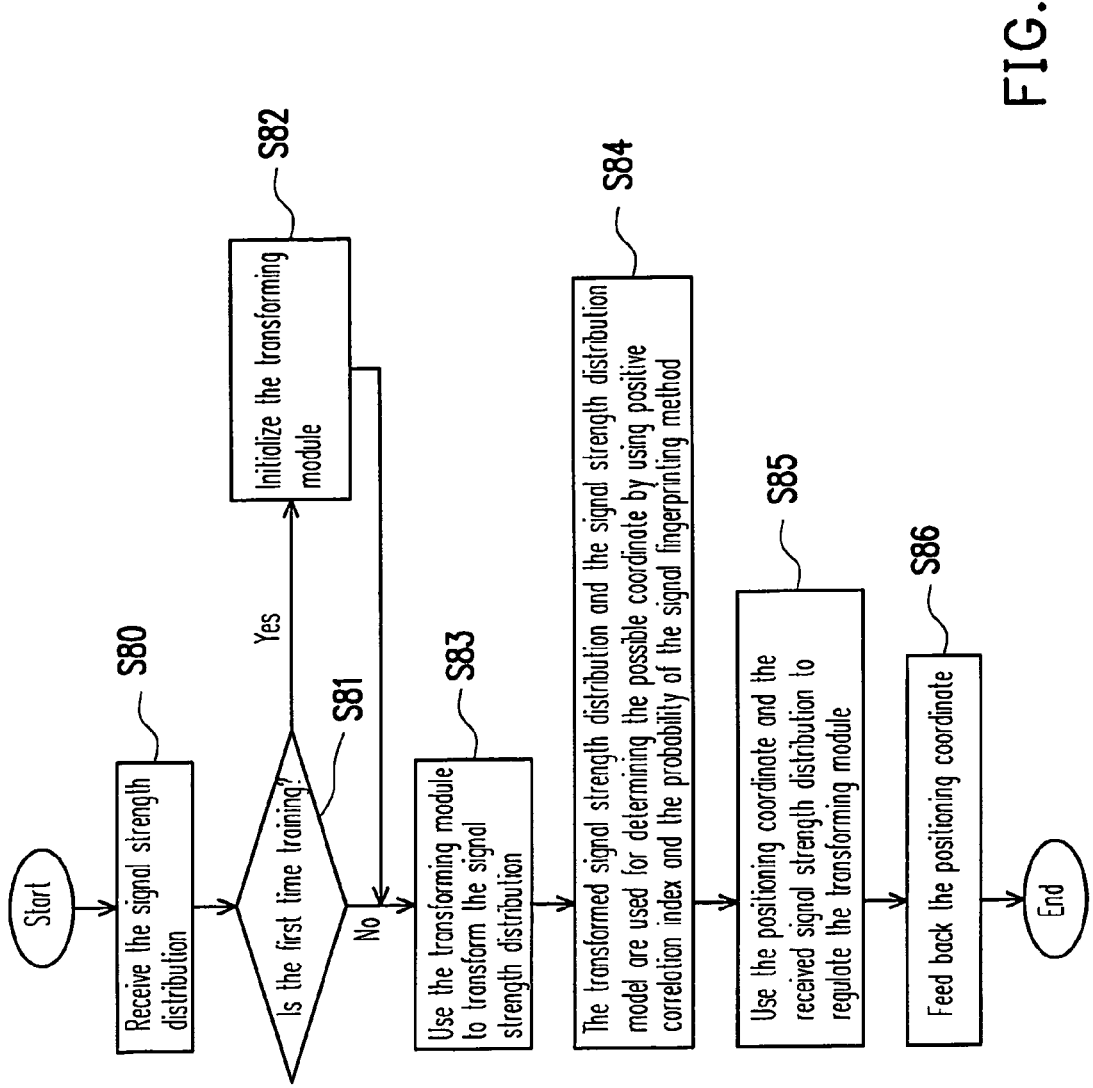
FIG. 11 is a flow chart illustrating an expectation-maximization algorithm method adopted by the apparatus 820 and the positioning circuit 830 according to an embodiment of the present invention.

FIG. 11 is a flow chart illustrating an expectation-maximization algorithm method adopted by the apparatus 820 and the positioning circuit 830 according to an embodiment of the present invention. Referring to FIG. 11, first at step S80, the unknown mobile communication apparatus $H_x$ receives a signal strength distribution $O_t$. Next, at step S81, the determining circuit 821 inspects whether it is a first time training, and if it is, then the procedure goes to step S82 to instruct the training transforming module circuit 823 to initialize the transforming module (i.e. $C_1$=1, $C_2$=0), and if it is determined that it is not the first time training, then the procedure proceeds to step S83. At step S83, the transforming module transforms the signal strength distribution received by the mobile communication apparatus $H_x$. At step S84, the transformed signal strength distribution and the signal strength distribution model are used for determining the possible coordinate by using positive correlation index and the probability of the signal fingerprinting method, and the positioning coordinate is generated. At step S85, the positioning coordinate and the signal strength distribution (untransformed) received by the mobile communication apparatus $H_x$ are used for regulating the training transforming module. Finally, at step S86, the positioning coordinate is fed back to the mobile communication apparatus $H_x$.

Compared to the online regression method, the method of the present invention is a progressive one, in which after each time the positioning coordinate (step S84) is obtained, the transforming module is regulated (step S85), and the regulated transforming module is used for transforming the signal strength distribution (step S83) in the next time positioning. The present method is based on the expectation that the transformed signal strength distribution would be closer to the signal strength distribution detected by the apparatus which is used for collecting the signal strength distribution model at each time point, and thus obtaining a possible coordinate with more accuracy. Such the more accurate possible coordinate can thus be used for regulating the transforming module again. And in such a way, the procedure is iteratively repeated, and the correctness of the possible location is expected to improve.

According to the method as discussed above, the location estimating calculation considers the positive correlation index and the probability of the signal fingerprinting method (calculating the probability according to likeliness of the received signals and recorded signals) at the same time. Because values being linearly transformed would not affect the correlation coefficient, therefore no matter how the transforming module being regulated, the positive correlation index won't be affected. In this manner, each time regulation of the transforming module allows the received signal strength distribution further approaching to the recorded signal strength distribution at the possible coordinate, so as to improve the probability of the signal fingerprinting method.

Figure 12:
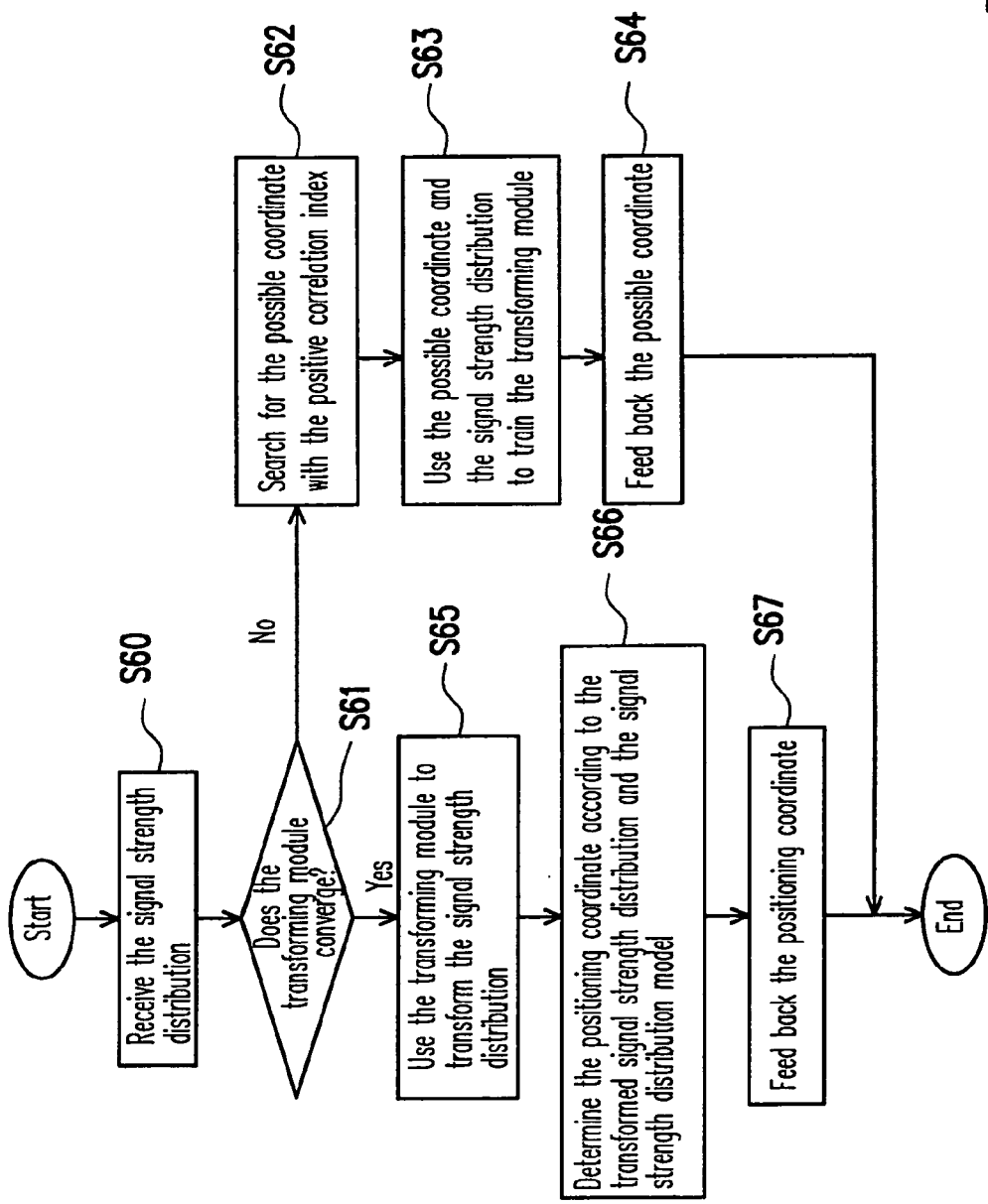
FIG. 12 is a flow chart illustrating a neural network algorithm method adopted by the apparatus 820 and the positioning circuit 830 according to an embodiment of the present invention.

FIG. 12 is a flow chart illustrating a neural network algorithm method adopted by the apparatus 820 and the positioning circuit 830 according to an embodiment of the present invention. Referring to FIG. 12, first at step S60, the unknown mobile communication apparatus $H_x$ receives a signal strength distribution $O_t$. Next, at step S61, the determining circuit determines whether the transforming module converges, and if it does, the procedure proceeds to step S65, and if it is determined that the transforming module does not converge, then the procedure proceeds to step S62. At step S62, the location estimation circuit 822 utilizes the positive correlation index to estimate a possible coordinate of the unknown mobile communication apparatus $H_x$, and takes the signal strength distribution recorded at possible coordinate and the received signal strength distribution $O_t$ of the present time point for matching as training data. Next, at step S63, the training transforming module circuit 823 utilizes the training data to regulate the training transforming module (the transforming module hereby is not linear). Next, at step S64, the positioning module 830 feeds back the possible coordinate to the mobile communication apparatus $H_x$.

At step S65, the transforming module transforms the received signal strength distribution $O_t$. At step S66, the positioning circuit 830 determines a positioning coordinate of the mobile communication apparatus $H_x$ according to the transformed signal strength distribution and the signal strength distribution model. At step S67, the positioning circuit 830 feeds back the positioning coordinate to the mobile communication apparatus $H_x$.

The present method similarly seeks for the possible coordinate with the positive correlation index at the beginning, and pairs signal strength distribution at the possible coordinate with the received signal strength distribution. Every pairs of data will be put in the neural network for calculation till the transforming module converges. The transforming module obtained thereby is then used for transforming signal strength and for positioning calculation. The present method differs from the foregoing in that the present method does not rely upon an assumption of a linear correlation between signal strengths received by different mobile communication apparatuses. In other words, the neural network method does not restrict the transforming module is a linear function.

FIG. 13 is an error table showing the errors between the positioned location according to the embodiment of the present invention and the real location. Referring to FIG. 13, status A represents that all wireless access points are used for measurement; status B represents that only indoor wireless access points are used for measurement; status C represents that a part of the indoor wireless access points are selected for measurement; and status D represents that averages of the A, B, and C statuses.

The mobile communication apparatus $H_c$ is first used to train a signal strength probability distribution model. Then the mobile communication apparatus $H_x$ collects signal strength distributions of the coordinates at a measurement path (about 20 meters). Next, simulations are conducted to test the effect of different methods, and the wireless access points are selected for testing environments of different wireless access point concentration (status A, B or C). The simulation, for example, moves along the measurement path for five rounds with a speed of 20 cm/s to measure the average error (meter). As listed in FIG. 13, the experimental result shows that when the embodiments of the present invention are used for positioning, the error caused thereby won't exceed 3 meters. The methods provided by the embodiment of the present invention drastically improve the positioning accuracy in environment of any variation factor compared to the untransformed situation. Because linear correlation is determined relying upon the signal strength ratio between different wireless access points, more wireless access points indicate more clues and less probability of causing error.

In summary, the transformation apparatus and method provided by the embodiments of the present invention do not require to pre-build a look-up table between the transforming modules and the mobile communication apparatuses as the conventional does. If there are several mobile communication apparatuses, the look-up table must occupy a very large space for recording each corresponding relationship. Further, whenever a new mobile communication apparatus is developed, a new look-up table must be built. Furthermore, the information data (ex: chip model) of the mobile communication apparatus may be not obtained according to the conventional technology. On the contrary, the transformation apparatus and method according to the embodiment of the present invention are capable of automatically training the transforming module so as to avoid the foregoing difficulties.

Furthermore, even when the information data and the location of the mobile communication apparatus are unknown, the transformation apparatus and method according to the embodiment of the present invention are still capable of automatically training the transforming module. Moreover, the transformation apparatus and method according to the embodiment of the present invention also consider that when the environment varies, the transforming relationship (i.e. relative equation) is linear, and thus a possible coordinate can be found out according to the positive correlation index for training the transforming module. Thereafter, the trained transforming module is used to transform the received signal strength distribution. The positioning coordinate can be determined according to the transformed signal strength distribution. As such, the present invention is also adapted for synchronously dealing with the signal strength difference caused by the environmental variations.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transformation apparatus for transforming a signal strength of a wireless positioning system, comprising: a location estimation circuit, for obtaining a possible coordinate of a mobile communication apparatus by calculating a positive correlation index according to at least one first signal strength distribution received by the mobile communication apparatus and a plurality of second signal strength distributions at different coordinates recorded in a signal strength distribution model.

2. The transformation apparatus according to claim 1, wherein the mobile communication apparatus has an unknown chip model and is at an unknown location.

3. The transformation apparatus according to claim 1, wherein the possible coordinate is a positioning coordinate.

4. The transformation apparatus according to claim 1, further comprising: a training transforming module circuit, coupled to the location estimation circuit, for training a transforming module according to a training data; and a transforming module circuit, coupled to the training transforming module circuit, for transforming the first signal strength distribution to a first transformed signal strength distribution according to the transforming module, wherein the location estimation circuit generates the training data according to the possible coordinate, and provides the training data to the training transforming module circuit, so as to allow the training transforming module circuit to train the transforming module, the training data comprising at least the second signal strength distribution at the possible coordinate recorded in the signal strength distribution model and the first signal strength distribution, and the signal strength distribution model is a data set records all the signal strength distributions in the space.

5. The transformation apparatus according to claim 4, further comprising: a positioning circuit, coupled to the transforming module circuit, for determining a positioning coordinate according to the first transformed signal strength distribution, wherein after the first signal strength distribution received by the mobile communication apparatus being transformed by the transforming module, the positioning circuit obtains the positioning coordinate of the mobile communication apparatus at any time point according to the signal strength distribution model and the first transformed signal strength distribution, in which the signal strengths recorded in signal strength distribution model at the positioning coordinate and the first transformed signal strength distribution are approximate to each other.

6. The transformation apparatus according to claim 4, further comprising: a determining circuit, coupled to the location estimation circuit and the transforming module circuit, for determining whether to train the transforming module or not, wherein if the transforming module has been trained completely, then the location estimation circuit is instructed not to generate the training data for the training transforming module circuit for training the transforming module; and if the transforming module has not been trained completely, then the location estimation circuit is instructed to generate the training data for the training transforming module circuit for training the transforming module.

7. The transformation apparatus according to claim 6, wherein the training transforming module circuit utilizes the location estimation circuit to generate the training data and utilizes an approximation algorithm for generating the transforming module.

8. The transformation apparatus according to claim 7, wherein the approximation algorithm is an online regression algorithm, an expectation-maximization algorithm, a neural network algorithm, an ant colony optimization (ACO) algorithm, a simulated annealing algorithm, a particle swarm optimization (PSO) algorithm, or a genetic algorithm (GA).

9. The transformation apparatus according to claim 8, wherein when the approximation algorithm is an online regression algorithm, and if the determining circuit determines that the transforming module is not yet built, the location estimation circuit utilizes the positive correlation index to calculate the possible coordinate, the first signal strength distribution and the possible coordinate are recorded; and thereafter, the determining circuit determines whether the data of the first signal strength distribution are enough, if the data of the first signal strength distribution data are enough, then the training transforming module circuit obtains the transforming module by calculating with a least minimum square error method according to the first signal strength distributions and the second signal strength distributions at the possible coordinates and the possible coordinate is set as the positioning coordinate; if the data of the first signal strength distribution are not enough, the possible coordinate is set as the positioning coordinate; or if the determining circuit determines that the transforming module has been built, the transforming module circuit transforms the first signal strength distribution according to the transforming module, and the positioning circuit calculates the positioning coordinate according to the first transformed strength distribution and the signal strength distribution model.

10. The transformation apparatus according to claim 8, wherein when the approximation algorithm is an expectation-maximization algorithm, and if the determining circuit determines that the transforming module is not a first time training, the transforming module circuit transforms the first signal strength distribution, and the positioning circuit calculates the positioning coordinate according to the first transformed strength distribution and the signal strength distribution model by using positive correlation index and the probability of the signal fingerprinting method, and the training transforming module circuit regulates the transforming module according to the positioning coordinate and the first signal strength distribution; or if the determining circuit determines that the transforming module is a first time training, the training transforming module circuit initializes the transforming module, the transforming module circuit transforms the first signal strength distribution according to the transforming module, and the positioning circuit calculates the positioning coordinate according to the first transformed strength distribution and the signal strength distribution model by using positive correlation index and the probability of the signal fingerprinting method, and the training transforming module circuit regulates the transforming module according to the positioning coordinate and the first signal strength distribution.

11. The transformation apparatus according to claim 8, wherein when the approximation algorithm is a neural network algorithm, if the transforming module converges, the transforming module circuit transforms the first signal strength distribution according to the transforming module, and the positioning circuit calculates the positioning coordinate according to the first transformed strength distribution and the signal strength distribution model; or if the transforming module does not converge, the location estimation circuit utilizes the positive correlation index to calculate the possible coordinate, and the training transforming module circuit trains the transforming module according to the possible coordinate and the first signal strength distribution, and the possible coordinate is set as the positioning coordinate.

12. A method for transforming a signal strength of a wireless positioning system, comprising: receiving at least one first signal strength distribution by a mobile communication apparatus; and generating a possible coordinate by calculating a positive correlation index according to the first signal strength distribution under an instant dynamic environment and a plurality of second signal strength distributions at different coordinates recorded in a signal strength distribution model.

13. The method according to claim 12, wherein the mobile communication apparatus has an unknown chip model and is at an unknown location.

14. The method according to claim 12, wherein the possible coordinate is a positioning coordinate.

15. The method according to claim 12 further comprising: generating a training data according to the possible coordinate, wherein the training data are at least the second signal strength distribution at the possible coordinate recorded in the signal strength distribution model and the first signal strength distribution, and the signal strength distribution model is a data set records all the signal strength distributions in the space; training a transforming module according to the training data; and transforming the first signal strength distribution into a first transformed signal strength distribution according to the transforming module.

16. The method according to claim 15 further comprising: determining a positioning coordinate according to the first transformed signal strength distribution, wherein after the first signal strength distribution is transformed by the transforming module, the positioning circuit obtains the positioning coordinate of the mobile communication apparatus at any time point according to the signal strength distribution model and the first transformed signal strength distribution, in which the signal strengths recorded in signal strength distribution model at the positioning coordinate and the first transformed signal strength distribution are approximate to each other.

17. The method according to claim 15 further comprising: determining whether the training of the transforming module has been trained, wherein if it has not been trained completely, then the training data is generated for training the transforming module, and if it has been trained completely, then the training data is not generated for training the transforming module.

18. The method according to claim 17, wherein an approximation algorithm is utilized for generating the transforming module according to the training data.

19. The method according to claim 18, wherein the approximation algorithm is an online regression algorithm, an expectation-maximization algorithm, a neural network algorithm, an ant colony optimization (ACO) algorithm, a simulated annealing algorithm, a particle swarm optimization (PSO) algorithm, or a genetic algorithm (GA).

20. The method according to claim 19, wherein when the approximation algorithm is an online regression algorithm, and if the transforming module is not yet built, the positive correlation index is used to calculate the possible coordinate according to the first signal strength distribution, and the first signal strength distribution and the possible coordinate are recorded; and it is determined whether the first signal strength distribution data are enough, wherein if the first signal strength distribution data are enough, the transforming module is obtained by calculating with a least minimum square error method according to the first signal strength distributions and the second signal strength distributions at the possible coordinates, and the possible coordinate is set as the positioning coordinate; if the data of the first signal strength distribution are not enough, the possible coordinate is set as the positioning coordinate; or if the transforming module has been built, the first signal strength distribution is transformed according to the transforming module, and the positioning coordinate is calculated according to the first transformed strength distribution and the received signal strength distribution model.

21. The method according to claim 19, wherein when the approximation algorithm is an expectation-maximization algorithm, and the transforming module is not a first time training, the transforming module transforms the first signal strength distribution, and the positioning coordinate is calculated according to the first transformed strength distribution and the signal strength distribution model by using positive correlation index and the probability of the signal fingerprinting method, and the transforming module is regulated according to the positioning coordinate and the first signal strength distribution; or if the transforming module is a first time training, the transforming module is initialized, the first signal strength distribution is transformed according to the transforming module, and the positioning coordinate is calculated according to the first transformed strength distribution and the signal strength distribution model by using positive correlation index and the probability of the signal fingerprinting method, and the transforming module is regulated according to the positioning coordinate and the first signal strength distribution.

22. The method according to claim 19, wherein when the approximation algorithm is a neural network algorithm, if the transforming module converges, the first signal strength distribution is transformed according to the transforming module, and the positioning is calculated coordinate according to the first transformed strength distribution and the signal strength distribution model; or if the transforming module does not converge, the possible coordinate is calculated by calculating the positive correlation index, and the transforming module is trained according to the possible coordinate and the first signal strength distribution, and the possible coordinate is set as the positioning coordinate.

* * * * *